Patented Dec. 22, 1942

2,305,738

UNITED STATES PATENT OFFICE 2,305,738

PROCESS FOR THE PRODUCTION OF LEVULINIC ACID

Georg Scheuing and Wilhelm Konz, Ingelheim-on-the-Rhine, Germany; vested in the Alien Property Custodian No Drawing. Application March 18, 1940, Serial No. 324,618. In Germany April 29, 1939

7 Claims. (Cl. 260—528)

This invention relates to a process for the production of levulinic acid by action of diluted acids upon wood.

It is known that, when moderately diluted mineral acids act upon carbohydrates, levulinic acid is formed in varying quantity. The yields, resulting from the action of hydrochloric acid solution of for instance 20% concentration, are about 20% of the used quantity of initial material. By employing higher temperatures, for instance 140 to 160° C. and higher pressure of about 4 to 8 atm. the yield could be increased to about 25%. As carbohydrates glucose, fructose, saccharose, starch and the like were used in the known processes.

It has already been proposed to produce levulinic acid from filter paper and fir-tree sawdust by the action of sulphuric acid of 5% and by boiling lasting 8 days. The yields obtained were however extraordinarily low.

It was found that particularly good yields in levulinic acid are obtained if diluted hydrochloric acid is made to act for instance upon disintegrated wood, for instance pine-tree sawdust under pressure and at higher temperature. In the treatment of wood with dilute hydrochloric acid at lower temperatures, for instance 100° to 120° C., in suitable cases also at 140° C., if the diluted hydrochloric acid is allowed to act only for a short time, about one hour, only monomer carbohydrates are chiefly produced, and it is necessary to operate the process according to the invention at higher temperatures and with longer reaction times in order to obtain levulinic acid. The essential feature of the process according to the invention consists therefore therein that disintegrated wood is treated with the diluted hydrochloric acid at such temperatures and pressures and for such a long period that the transformation of the cellulose constituents of the wood takes place directly up to the stage of the levulinic acid, the formation of considerable quantities of simple carbohydrates being avoided.

The use of a hydrochloric acid of up to 10%, and especially of a hydrochloric acid of 3 to 8%, has shown to be especially advisable. The working temperatures lie between 130 to 180° C., and especially good yields are obtained at 160 to 170° C. For one part of air-dried wood about 3 to 5, preferably 4 parts of a hydrochloric acid of 3 to 8% are employed. The most favorable reaction time is about 3 hours. The yields strongly decrease when the reaction period is shorter.

In the process according to the invention 1 part levulinic acid is obtained from 6 parts air-dried wood such as sawdust.

The use of hydrochloric acid presents the advantage that the reaction product which is obtained can be isolated in a particularly simple manner. After the evaporation of the water and of the hydrochloric acid in the vacuum the levulinic acid which has been formed can be separated without any other treatment by distillation at reduced pressure.

The process according to the invention will be hereinafter explained by an example without limiting the invention to the quality proportions stated in this example. The parts mentioned are parts by weight.

Example 30 parts air-dried pine-wood sawdust are well mixed with 120 parts of hydrochloric acid of about 6% and heated in an autoclave up to 160 to 170° C. The reaction lasts 3 hours. Immediately after the cooling to about 90° C. the black, undissolved, crumbly mass is sucked off and boiled twice, each time with 120 parts of water. The dark brownish colored filtrate and the considerably lighter wash water are evaporated in the vacuum until almost all water and all hydrochloric acid have been removed. The remaining residue is fractionated in the vacuum and yields about 5 parts levulinic acid which is obtained absolutely pure by repeated vacuum distillation. The final purification which yields a colorless crystalline product of a melting point of approximately 31° C. is attained by crystallization from a 95% aqueous solution.

We claim:

1. Process for the production of levulinic acid by action of diluted hydrochloric acid under pressure and at higher temperatures upon pine wood, which comprises treating the disintegrated wood with the diluted hydrochloric acid at temperatures above 100° C. and at elevated pressures and so long that the conversion of the cellulose constituents of the wood takes place with avoidance of the formation of considerable quantities of simple carbohydrates directly up to the stage of the levulinic acid, the temperature being from 130° to 180° C.

2. Process for the production of levulinic acid by action of diluted hydrochloric acid under pressure and at higher temperatures upon pine wood, which comprises treating the disintegrated wood with hydrochloric acid of 3 to 8% at 130 to 180° C. under pressure during about 3 hours, 4 parts by weight of the hydrochloric acid of 3 to 8% being employed for 1 part by weight of air-dried wood.

3. Process for the production of levulinic acid which comprises heating disintegrated wood with diluted hydrochloric acid solution in a closed vessel to a temperature of about 130°–180° C., the temperature being maintained for a sufficient length of time until hydrolytic decomposition results in the formation of levulinic acid without the formation of considerable quantities of simple carbohydrates.

4. Process for the production of levulinic acid which comprises heating disintegrated pine wood with diluted hydrochloric acid solution in a closed vessel to a temperature of about 130°–180° C., the temperature being maintained for a sufficient length of time until hydrolytic decomposition results in the formation of levulinic acid without the formation of considerable quantities of simple carbohydrates.

5. Process for the production of levulinic acid which comprises heating disintegrated wood with diluted hydrochloric acid solution containing not over 10% of HCl in a closed vessel to a temperature of about 130°–180° C., the temperature being maintained for a sufficient length of time until hydrolytic decomposition results in the formation of levulinic acid without the formation of considerable quantities of simple carbohydrates.

6. Process for the production of levulinic acid which comprises heating disintegrated wood with diluted hydrochloric acid solution in a closed vessel to a temperature of 160°–170° C., the temperature being maintained for a sufficient length of time until hydrolytic decomposition results in the formation of levulinic acid without the formation of considerable quantities of simple carbohydrates.

7. Process as specified in claim 3, in which for 1 part air-dried wood 4 parts of hydrochloric acid of 3 to 8% are used.

GEORG SCHEUING.
WILHELM KONZ.